United States Patent [19]

Van De Goor et al.

[11] 3,871,578

[45] Mar. 18, 1975

[54] DATA PROCESSING SYSTEM FOR MULTIPLYING AND INTERGERIZING FLOATING POINT NUMBERS

[75] Inventors: Adrianus J. Van De Goor, Wilnes, Netherlands; Leonard B. Hughes, Stow, Mass.

[73] Assignee: Digital Equipment Corporation, Maynard, Mass.

[22] Filed: Oct. 10, 1972

[21] Appl. No.: 296,028

[52] U.S. Cl. .............................................. 235/164
[51] Int. Cl. .............................................. G06f 7/52
[58] Field of Search ............ 235/156, 150, 159, 164

[56] References Cited

UNITED STATES PATENTS

| | | | |
|---|---|---|---|
| 3,022,006 | 2/1962 | Alrich et al. | 235/160 |
| 3,389,379 | 6/1968 | Erickson et al. | 340/172.5 |
| 3,697,734 | 10/1972 | Booth et al. | 235/164 |

OTHER PUBLICATIONS

C. V. Freiman et al., "Normalized Integer Operation for a Fl. Pt. Arith. Unit" IBM Tech. Disclosure Bulletin, Vol. 9 No. 7, Dec. 1966, pp. 850–851.

*Primary Examiner*—Eugene G. Botz
*Assistant Examiner*—David H. Malzahn
*Attorney, Agent, or Firm*—Cesari and McKenna

[57] ABSTRACT

A data processing system for multiplying two numbers. A separate unit multiplies the mantissas of two floating-point numbers and stores the product in a register with a precision which is greater than that in either number being multiplied. Then the product is converted into an integer value and a fraction value, each in floating-point form. The total precision for both fractions is greater than either of the numbers being multiplied so any loss of accuracy is minimized. In some cases the multiplication occurs with no loss of accuracy.

6 Claims, 7 Drawing Figures

| STEP | QR3(DBL) | QR2(DBL) | STRG I | FUNCTION |
|---|---|---|---|---|
| 201 | 0 | 0 | 0 | RIGHT SHIFT QR, AR, INCREMENT SC. |
| 203 | 0 | I | 0 | AR←BR + AR, RIGHT SHIFT QR, AR INCREMENT SC. |
| 202 | I | 0 | 0 | RIGHT SHIFT QR, AR, INCREMENTS SC. |
| 204 | I | I | 0 | AR←AR−BR, RIGHT SHIFT QR, AR, SET STRGI, INCREMENT SC. |
| 208 | 0 | 0 | I | AR←AR+BR, RIGHT SHIFT QR, AR, RESET STRGI, INCREMENT SC. |
| 206 | 0 | I | I | RIGHT SHIFT QR, AR, INCREMENT SC. |
| 207 | I | 0 | I | AR←AR−BR, RIGHT SHIFT QR, AR, INCREMENT SC. |
| 205 | I | I | I | RIGHT SHIFT QR, AR INCREMENT SC. |

DATA PROCESSING SYSTEM FOR MULTIPLYING AND INTERGERIZING FLOATING POINT NUMBERS

BACKGROUND OF THE INVENTION

This invention generally relates to digital computers which perform arithmetic operations and specifically to multiplication operations in digital computers.

Numbers to be multiplied normally are stored as fixed-point binary numbers with a binary point separating integer and fraction portions. However, digital computers often perform multiplication operations in a floating-point format. It is, therefore, necessary to convert a fixed-point number into a floating-point format consisting of an exponent and mantissa. In binary notation, the mantissa is a fraction with a binary point on the immediate left and a sign bit on the left of the binary point. The exponent value represents the power of two by which the mantissa is multiplied to obtain the number in fixed-point form. Usually the mantissa is "normalized" by removing any leading zeroes, i.e., immediately on the right of the binary point. This is done by iteratively shifting the mantissa left until the leading zeroes are eliminated while decrementing the exponent value each time the mantissa is shifted.

With floating point number, the multiplication process comprises the steps of multiplying the mantissas and adding the exponents. In prior art multiplication operations, the product is normalized. Then the mantissa for the product is usually truncated or rounded off to same precision as the numbers being multiplied. If there are $n$ bits in each of the multiplicand and the multiplier mantissas, then conventional computer operations produce a product mantissa containing $n$ bits. With the precision thus remaining constant throughout the operation, the product accuracy decreases.

Normally these inaccuracies are not significant. However, inaccuracy can be detrimental when performing a series expansion, as is often necessary to calculate a trigonometric function. These inaccuracies are also detrimental when converting a binary number into a decimal number which a peripheral device prints out. In both these and other examples, truncating or rounding the product mantissa may introduce errors.

It is often desirable to obtain the product immediately as separate integer and fraction floating-point numbers. Prior computer systems usually require a separate instruction or subroutine to convert a product into separate integer and fraction values. These operations increase processing time and detract from the overall performance of the data processing system.

Therefore, it is an object of this invention to provide a digital computer system which multiplies numbers with a minimal loss of accuracy.

Another object of this invention is to provide a digital computer system which produces a product as separate integer and fraction values.

SUMMARY

In accordance with this invention, a digital computer system has means for executing a modulo instruction which multiplies two numbers in a floating-point unit. The floating-point unit performs a standard multiplication operation, but stores intermediate and final products in a storage register with more precision than characterizes either of the numbers being multiplied. If the exponent value for the final product being multiplied lies in a given range, the floating-point unit converts the product mantissa into separate integer and fraction values, each of which may have the same precision as the numbers being multiplied. Therefore, the product is more precise and any loss of accuracy is minimized.

This invention is pointed out with particularity in the appended claims. A more thorough understanding of the above and further objects of this invention may be obtained by referring to the following description taken in conjunction with the accompanying drawings.

DESCRIPTION OF AN ILLUSTRATIVE EMBODIMENT

Figure 1:
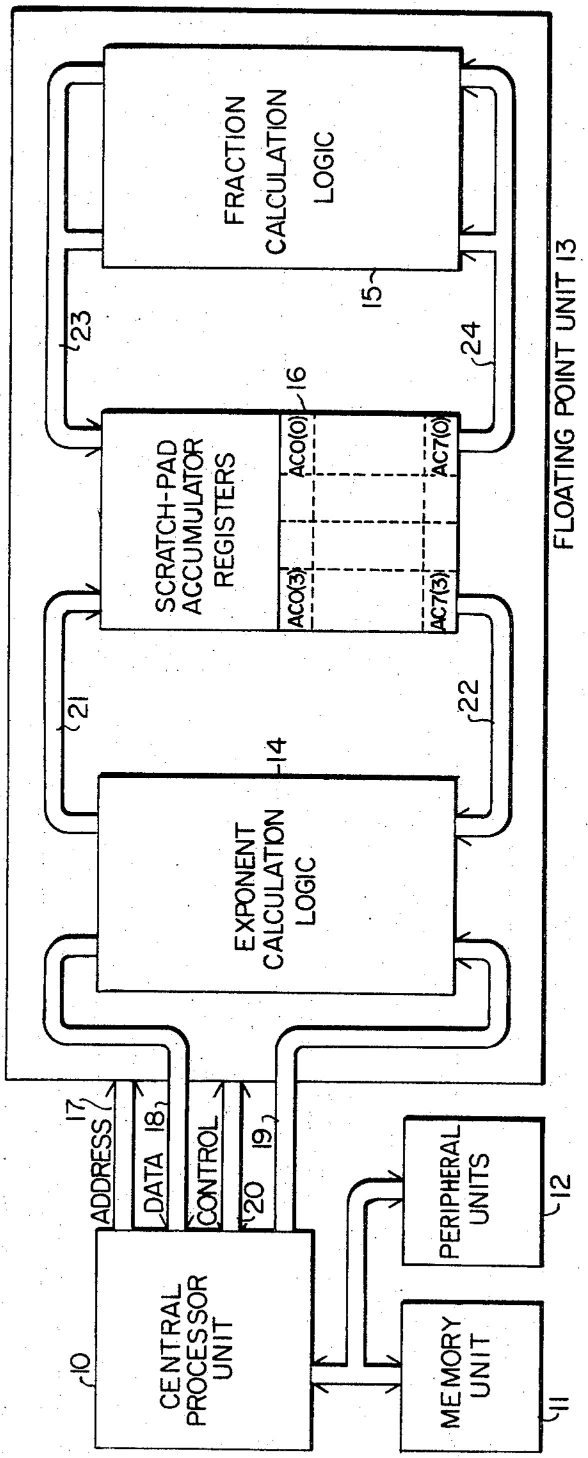
FIG. 1 depicts a data processing system with a central processor unit and a floating-point unit for performing arithmetic operations in accordance with this invention.

FIG. 1 depicts a data processing system capable of utilizing this invention. A central processor unit 10 is at the heart of the system shown in FIG. 1. It normally executes program instructions in sequence. A memory unit 11 stores these instructions and also the data the instructions use. Peripheral units 12, such as input/output typewriters and magnetic disk or drum memories, also connect in parallel to the central processor unit 10 and memory unit 11.

A floating-point unit 13 connects to the central processor unit 10 as shown in FIG. 1 and responds to a specific class of instructions, hereinafter "floating-point instructions." When the central processor unit 10 decodes a floating-point instruction, the central processor unit 10 transfers the instruction, an address if any, and control signals to the floating-point unit 13. When the floating-point unit 13 finishes the operation, the central processor unit 10, under program control, retrieves the results.

The floating-point unit 13 operates with floating-point numbers. As shown in FIG. 1, an exponent calculation logic unit 14 processes exponent information as well as data information. Fraction calculation logic unit 15 processes the mantissa. Scratch pad accumulator register unit 16 contains general purpose registers which store data and are used for register-to-register transfers. In this specific embodiment each register comprises a plurality of "word" locations.

The central processor unit 10 or memory unit 11 can normally be characterized by the number of digital bits in one digital "word." Using the term "word" in the sense of identifying a digital word of $n$ bits, each register in the register unit 16 may store two or four words depending upon whether the floating-point unit 13 is to perform a single or double precision arithmetic operation. In terms of the accumulator register, each "word" is a register byte and each register is addressed first by identifying the register by number and then by identifying the byte. For example, AC4[0]

identifies the least significant byte in accumulator register 4 while AC4[3] identifies the most significant register byte.

When a floating-poing number transfers to the fraction calculation logic unit 15, it transfers as a positive normalized fraction of the form 0.1xxxxxx. Since the most significant bit to the right of the binary point is always a 1 in a normalized fraction, it can be omitted from the stored version of the number without losing any information about the number. Hence, a number transferred to the floating-point unit 13 comprises a leading sign bit, a number of bits representing the exponent and a number of bits representing the fraction, with the actual number of fraction bits being one less than the number of bits in the normalized fraction.

Normally, the sign bit, exponent bits and fraction bits constitute two words in storage; this is a single precision number. If the number of fraction bits increases so four words constitute the number, then the number is considered to be a double precision number.

There are several buses connecting the central processor unit 10 and the floating-point unit 13 and circuits within the floating-point unit 13. Address information moves from the central processor unit 10 to the floating-point unit 13 over a bus 17. Whenever the central processor unit 10 "wants" the results of an operation performed in the floating-point unit 13, it retrieves the data over bus 18. Data transfers to the floating-point unit 13 occur over a bus 19. A bidirectional bus 20 passes control signals between the two units.

Within the floating-point unit 13, transfers to the accumulator register unit 16 from the exponent calculation logic unit 14 occur over a bus 21 while a bus 22 returns information from the accumulator register unit 16 to the exponent calculation logic unit 14. Similarly buses 23 and 24 transfer data to the register unit 16 from the fraction calculation logic unit 15 and from the accumulator register unit 16 to the fraction calculation logic unit 15, respectively.

The circuitry in FIG. 1 can perform any number of functions in response to a specific subset of instructions which the central processor unit 10 can execute. The central processor unit 10 contains an instruction register which identifies floating-point instructions. If the floating-point unit 13 can process the information, the central processor unit 10 transfers the floating-point instruction and other information to the unit 13.

Figure 2:
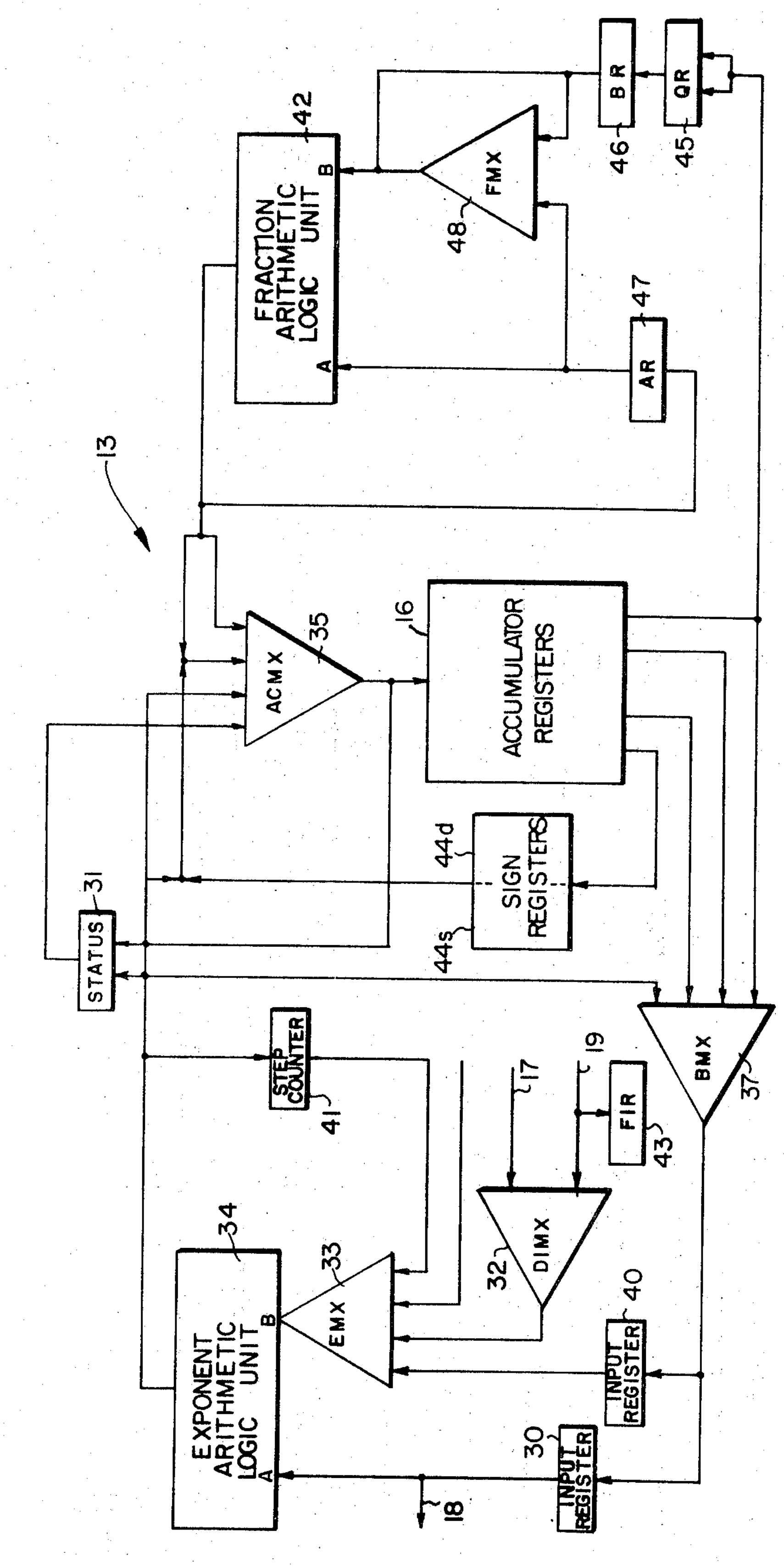
FIG. 2 is a detailed block diagram of the floating-point unit shown in FIG. 1.
Figure 3A:
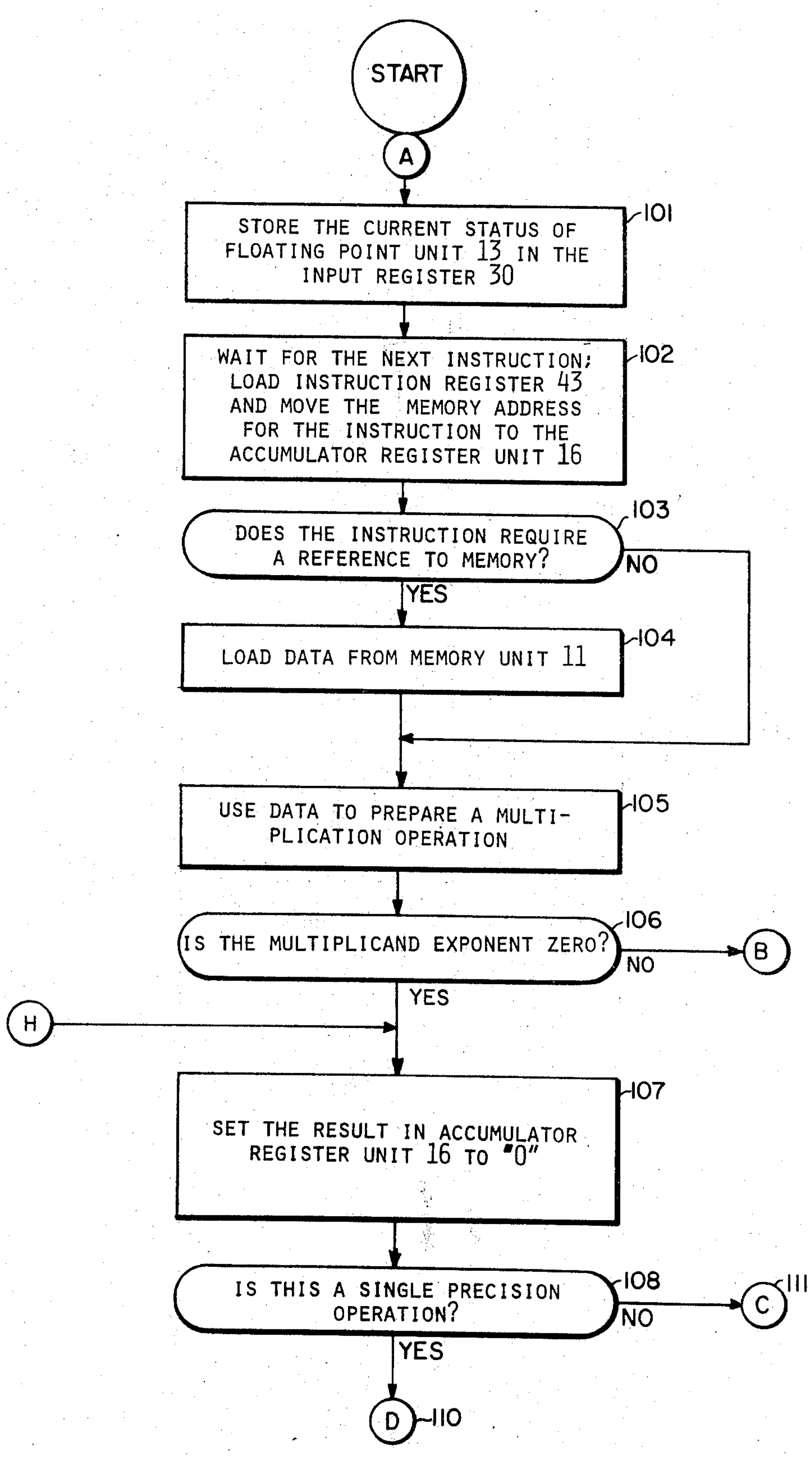
FIGS. 3A through 3D constitute a flow diagram to illustrate the operation of modulo instruction in accordance with this invention.

Referring now to FIGS. 2 and 3, whenever the floating-point unit 13 completes an operation, it executes Step 101 (FIG. 3A). During this step the floating-point unit 13 (FIG. 2) loads its current status into an input register 30 from a status register 31. The floating-point status register 31 contains the current operating status for the floating-point unit 13 including condition codes and other signals. The input register 30 provides data to the central processor unit over the bus 18 and to an A input of the exponent arithmetic logic unit 34.

During Step 101 the status word transfers through an accumulator multiplexer (ACMX) 35, which selectively can transfer two words in parallel into the scratch pad accumulator register unit 16. In this case, the status word moves to the AC7[0] register byte location. Then the system unit 13 enables a bus multiplexer (BMX) 37, which can select one of four input sources as an input to either the input register 30 or another input register 40, to transfer the status word into the input register 30.

In Step 102 a data input multiplexer (DIMX) 32, an exponent multiplexer (EMX) 33, an exponent arithmetic logic unit 34 and the accumulator multiplexer 35 open a path to the accumulator register unit 16. At this point the preceeding operation terminates until the central processor unit 10 begins the next operation with a floating-point instruction.

When the central processor unit decodes a floating-point instruction, it generates a control signal. Immediately the system loads the instruction on the bus 19 into a floating point instruction register (FIR) 43 which stores the operation code (Step 102). When the central processor unit transfers the floating-point instruction address onto the bus 17, the address moves through the input multiplexer 32, the exponent multiplexer 33 and the accumulator multiplexer 35 into the AC7[1] byte. Hence, the AC7[1] register byte location contains the program counter contents for the instruction it is executing.

The particular arithmetic operations of this invention occurs in response to MODx instruction which may or may not require data from memory unit 11. There are two MODx instructions: A MODF instruction for single precision numbers and a MODD instruction for double precision numbers. This instruction has the format:

MODx SRC, DST

DST identifies only a register in the unit 16 which contains a multiplicand and which will contain the product. A separate instruction or prior operation stores the number in the register unit 16. SRC may identify either a register in the unit 16, or the memory unit 11, which contains the multiplier.

If data is in the memory unit 11 (FIG. 1), Step 104 moves the data to the unit 16. The first data word identified by the SRC address is loaded into AC6[3] through the exponent multiplexer 33, the exponent arithmetic logic unit 34 and accumulator multiplexer 35. If no more data is present, the system clears the next register byte, AC6[2] and the least significant pair of words (i.e., the AC6[1:0] register bytes). Otherwise the second data word moves to the AC6[2] register byte through the exponent multiplexer 33, the exponent arithmetic logic unit 34 and the accumulator multiplexer 35. If the operation is a single precision operation, the system clears the AC6[1:0] bytes. With double precision numbers, the third and fourth data words move to AC6[1:0].

Step 105 in FIG. 3A prepares the unit for the multiplication. First a step counter 41 in FIG. 2 is loaded with the number representing the number of bits in a single precision operation. Next the data in ACdst[3:2] bytes is retrieved. The sign bit moves to a sign register 44d (a flip-flop for example). The exponent data from the ACdst[3:2] byte location moves to the input register 30 while the high order bytes of a QR register 45 receive the entire output from the unit 16 and transfer this information into a BR register 46. If the numbers are single precision, the multiplicand is loaded in the QR register 45 and BR register 46, which each have a number of bits exceeding the number of bits in a double precision mantissa.

If the numbers are double precision numbers, the least significant half of the multiplicand is stored in the BR register 46 and the step counter 41 is loaded with the number equal to the number of bits in a double precision number. The system generates this constant and transfers it through the exponent multiplexer 33 and exponent arithmetic logic unit 34 to step counter 41. Then the least significant data bytes in the ACdst[1:0] byte location move through the QR register 45 to the BR register 46.

Once the system stores the multiplicand, it stores the multiplier sign in the sign register 44s, the multiplier exponent in the input register 40 and mantissa in the QR register 45 and clears the AR register 47. The AR register is a normalization register which is capable of shifting its contents to the left and which has more bit positions than the number of bits in a double-precision mantissa.

This completes Step 105 and the system next tests to see if the multiplicand exponent in the input register 30 is zero. By definition, a floating-point number with a zero exponent has a value of 0. In the floating-point unit 13 an exponent is stored as a biased number. For example, a bias of $200_8$ might be used. This means that an exponent value of zero is really an exponent value of $(-200_8)$, which is an insignificant number and effectively equal to zero. The system stores zeroes in ACDdst$_r$1 (that is if the ACdst is ACO, then ACdst$_r$1 is AC1). Specifically, Step 107 stores zeroes in ACdst$_r$1[3:2], the high order bytes. After that the system transfers to Step 110 if a single precision operation is involved or Step 111 if the operation concerns a double precision operation in order to store zeroes in other register byte locations. These steps are discussed later.

Figure 3B:
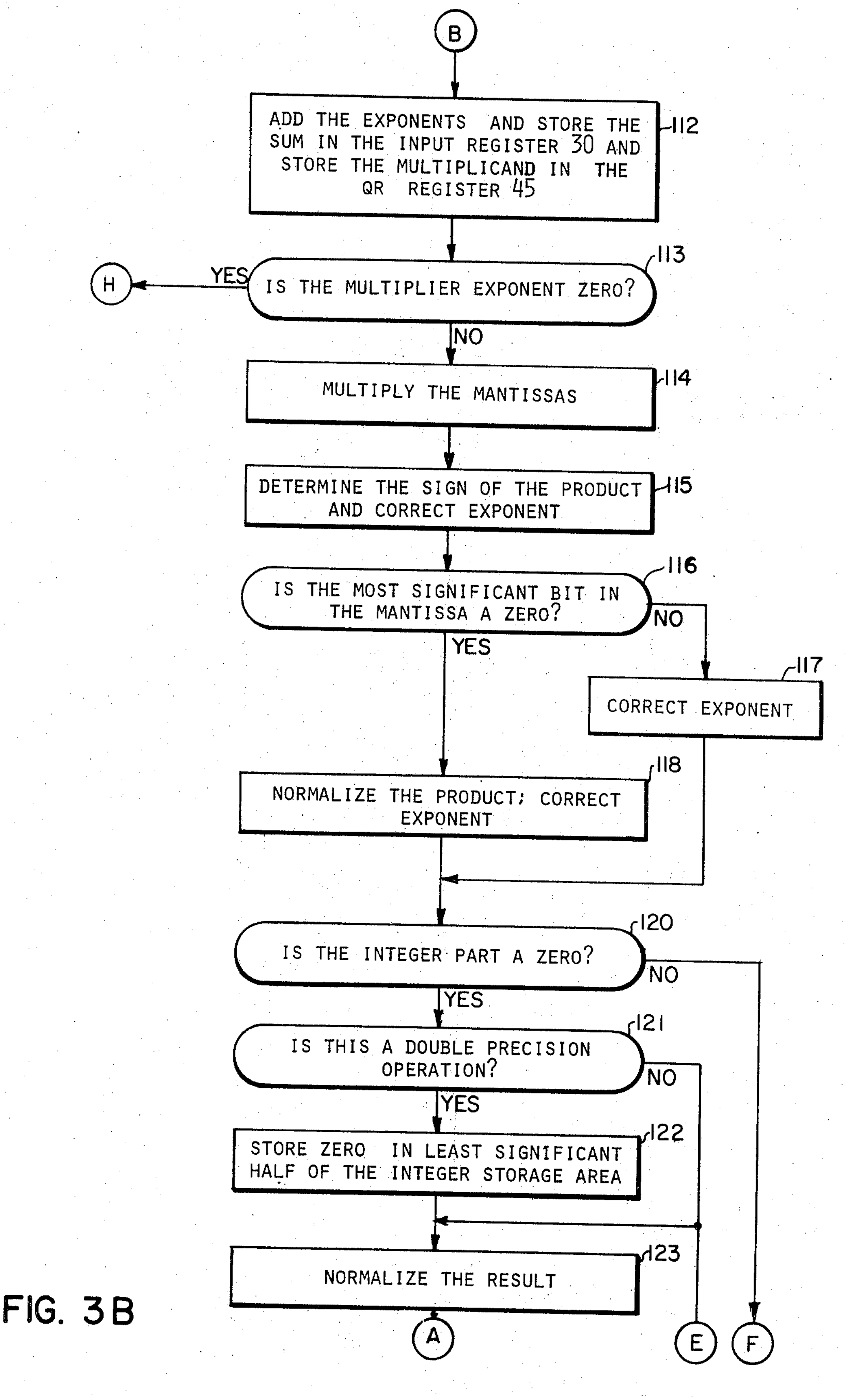

If the exponent tested in Step 106 is not zero, then the system adds the exponents in the input registers 30 and 40, storing the sum in the input register 30 (Step 112 in FIG. 3B). The low order words in the multiplicand then move from the source register ACsrc[1:0] in the unit 16 to the QR register 45. At this point, the system tests the multiplier for a zero exponent. If the exponent is zero (Step 113) the system transfers back to Step 107. If the multiplier exponent is not zero, Step 113 transfers to Step 114 and the two numbers are multiplied.

Any multiplication method may be used; a conventional adding and shifting method or a method of shifting over 1's and 0's are examples. In the latter method, the Br register 46 contains the multiplicand and the QR register 45 contains the multiplier. When the operation begins the AR register 47 is cleared; it retains partial products and the final product. Step counter 41 contains the 1's complement of the number of bits in the multiplier. It is incremented after each shifting operation.

When the multiplier is loaded into the QR register 45, the least significant bit is loaded into a QR3 bit position and the least significant bits (OR0-WR2) are reset. There is also a flip-flop identified as STRG 1 (string of 1's) flip-flop, not shown in FIG. 2. When both the QR3 and QR2 positions contain ONE's and the STRG 1 flip-flop is reset, then the STRG 1 flip-flop sets and a subtraction operation occurs. If the QR3 and QR2 positions center ZEROES and STRG 1 flip-flop is set, an addition operation occurs and the STRG 1 flip-flop resets.

Figure 4:
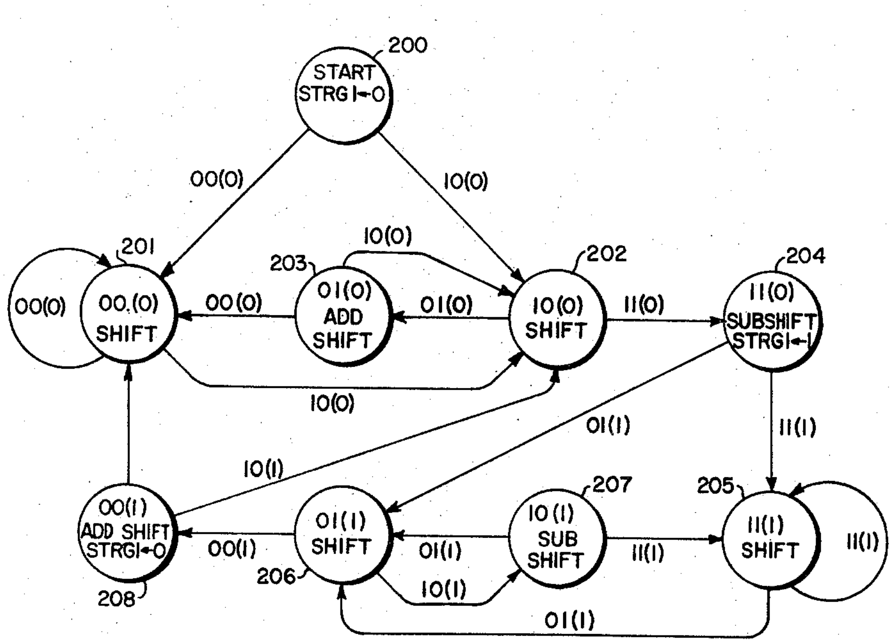
FIG. 4 is a state diagram and table which define a multiplication operation.

FIG. 4 is a multiplier state diagram to show the various operations which occur in multiplying two double precision numbers. If single precision numbers are involved, the unit 13 looks at bit positions QR35 and QR34 rather than positions QR3 and QR2 to determine when a string of 1's begins or terminates.

FIG. 4 is self-explanatory. Suffice it to say that in this method, when the unit encounters a string of 1's (two or more consecutive 1's), it subtracts the multiplicand in the BR register 46 from the partial product in the AR register 47 and then shifts the AR register one position to the right storing a 1 in the most significant bit position. At this time, the unit also shifts the multiplier in the QR register 45 one position to the right and increments the step counter 41. When the string of 1's terminates the unit adds the multiplicand and partial product and then shifts the AR register 47 to the right introducing a ZERO. At the same time the QR register 45 is also shifted to the right and the step counter 41 is incremented. For all other conditions the unit 13 merely shifts the AR register 47 and QR register 45 and increments the counter. During these shifts, a "ONE" moves into the AR register 47 after a subtraction operation while a "ZERO" moves in after an addition operation.

When the step counter 41 reaches a predetermined number (e.g.,-1) the multiplication operation (Step 114) is finished and the AR register 47 contains the product mantissa. As the AR register 47 has more bit positions than a double precision mantissa, the product has more precision than the numbers being multiplied. In the case of single-precision numbers, there is no accuracy lost because no bits are lost. The product contains a number of bits equal to the sum of bits in the numbers being multiplied.

Once the fraction arithmetic logic unit 42 completes the multiplication operation in Step 114, it determines the sign of the product in Step 115 by combining the signs stored in registers 44*s* and 44*d* in an exclusive OR operation, the result being restored to the sign register 44*d*.

As both exponents are biased, the sum has two times the bias. Step 115 also corrects the exponent by transferring (1) a bias constant through the exponent multiplexer 33 and (2) the exponent sum in the input register 30 to the exponent arithmetic logic unit 34 where the bias constant is subtracted. The resultant exponent value, with the proper bias, is restored to the input register 30 through the bus multiplexer 37.

In Step 116 the system determines whether the product mantissa is normalized. If most significant bit position in the product contains a one, the product is normalized. Therefore, the system merely corrects the exponent in Step 117 by again transferring the exponent from the input register 30 to the exponent arithmetic logic unit 34 and a bias constant through the exponent multiplexer 33, subtracting the two numbers and restoring the new unbiased exponent to the input register 30 through bus multiplexer 37. If the product is not normalized, Step 118 transfers the bias constant and the biased exponent from the input register 30 into the exponent arithmetic logic unit 34. Then unit 13 subtracts the bias constant from the bias exponent and decrements the difference by one. After the floating point unit 13 restores the unbiased exponent to the input register 30, it shifts the contents of the AR register 47 left one position thereby normalizing the result.

Once Step 117 or Step 118 finishes the floating point number is converted into separate integer and fraction values. If Step 120 determines that the unbiased exponent is zero or negative, there is no integer value. So the floating point unit 13 stores all zeroes in the high order bytes in the accumulator register 16, specifically in the ACdst$_r$1[3:2] register byte locations. If the multiplication involves a double precision operation, Step 121 diverts to Step 122 before normalizing the result in Step 123. In Step 122 the least significant two bytes of the designated accumulator register. ACdst,+1[1:0] receive zeroes. Step 123 normalizes the result.

In normalizing the result (Step 123) the floating point unit performs one of four functions depending upon whether the MODx instruction indicates the answer is to be truncated and whether the operation involves single or double precision numbers. If the system is operating in single precision and the answer is not to be truncated the system rounds the result by transferring a rounding function through a fraction multiplexer (FMX) 48 to combine the rounding function with the intermediate product from the AR register 47. The AR register 47 stores the rounded result. As a second function during a rounding operation the high order bytes in the AR register 47 move through the accumulator multiplexer 35 into the ACdst[3:2] register byte location. Then the system performs a function depending upon the contents of the AR register 47 and the input register 30.

In double precision operations, the system may round the result in the AR register 47. Whether the result is truncated or rounded, the unit 13 stores the high order bytes in the ACdst [3:2] register byte locations and the low order bytes in the Acdst [1:0] register byte locations.

After performing one of the four preceeding normalizing functions, the system merely tests the results and returns to Step 101 in FIG. 3A if the most significant bit in the AR register 47 is a ZERO. This means that the result is normal.

On the other hand, if the most significant bit in the AR register 47 is a ONE, the answer is not normal so the unit again tries the above-mentioned normalization routine. When these steps are finished the ACdst register in the unit 16 contains a two-word fraction in the case of double precision. The next register, the ACdst,+1 register, contains ZEROES.

Figure 3C:
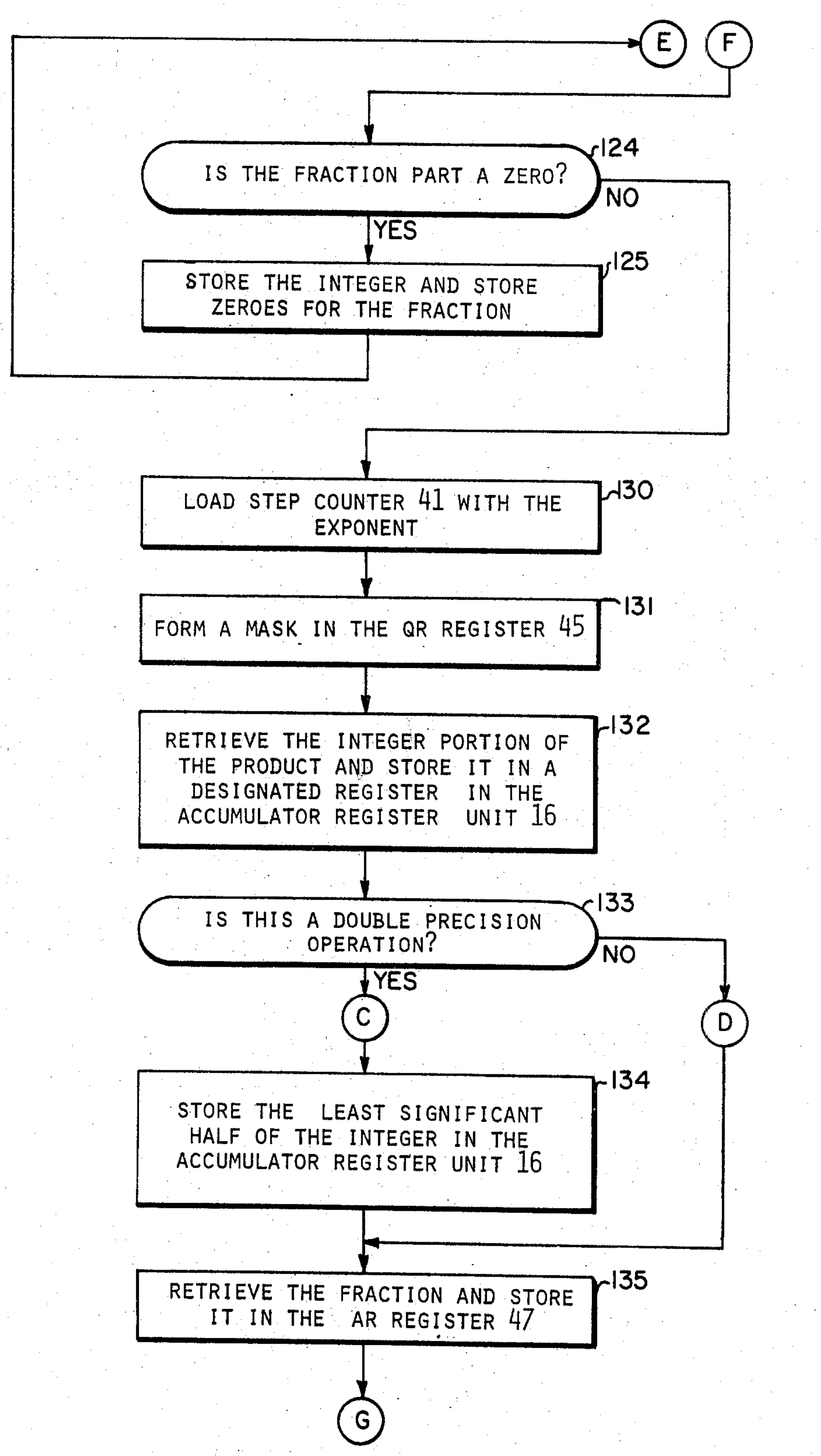

If the exponent of the product is positive (Step 120), the unit diverts to Step 124 in FIG. 3C. If, in step 124, the exponent is "very large," the fraction part is a zero. A "very large" exponent is one whose value is greater than the number of bits in the numbers being multiplied. In this case the unit 13 adds the bias constant to the exponent stored in the input register 30 and returns the biased exponent from the exponent arithmetic logic unit 34 through the bus multiplexer 37 to the input register 30.

Now it is possible to use Step 125 to store the most significant bits of the integer in the ACdst,+1[3:2] register byte locations. The product in the AR register 47 merely moves to the fraction arithmetic logic unit 42; then the AC multiplexer 35 moves the high-order bytes into the designated register in the unit 16. In the case of double precision numbers, analogous operations store the low order integer bytes in the ACdst,+1[1:0]. Zeroes are stored in ACdst[1:0] and ACdst[3:2] register byte locations to represent the fraction. Once Step 125 is finished, portions of Step 123 in FIG. 3B are used to complete the operation. As the product is normalized, Step 123 merely makes certain tests before returning to Step 101.

In many cases, the exponent value is positive but not "very large." This means that the unit 13 can generate separate integer and fraction numbers. The system begins with Step 130. First, the step counter 41 receives the exponent from the input register 30 by way of the exponent arithmetic logic unit 34. In Step 131 specifically both the input registers 30 and 40 receive the biased exponent by way of the exponent multiplexer 33, the exponent arithmetic logic unit 34 and bus multiplexer 37. Then the step counter 41, which contains the unbiased exponent, is decremented each time the QR register is shifted right with ONE being loaded into the most significant bit position. When the step counter 41 reaches zero, the mask in the QR register 45 moves to the BR register 46.

Step 132 generates the integer value by combining the contents of the Br register 46 and AR register 47 in the fraction arithmetic logic unit 42 with a logical AND operation. After the exponent multiplexer 33 receives the contents of the input register 40, the high-order integer bytes and exponent value are stored in the ACdst,+1[3:2] register byte locations through the accumulator multiplexer 35.

Step 133 causes the unit 13 to perform Step 134 for double precision operations. Step 134 transfers the low order bytes from the fraction arithmetic logic unit 42 through the accumulator multiplexer 35 in to the ACdst,+1[1:0] register byte locations.

Next, Step 135 retrieves the fraction by complementing the mask stored in the BR register 46 and combining the complemented mask and contents of the AR register 47 in a logical AND operation in the fraction arithmetic logic unit 42. The AR register 47 stores the result. The fraction is then normalized as previously discussed and stored in floating-point form.

Figure 3D:
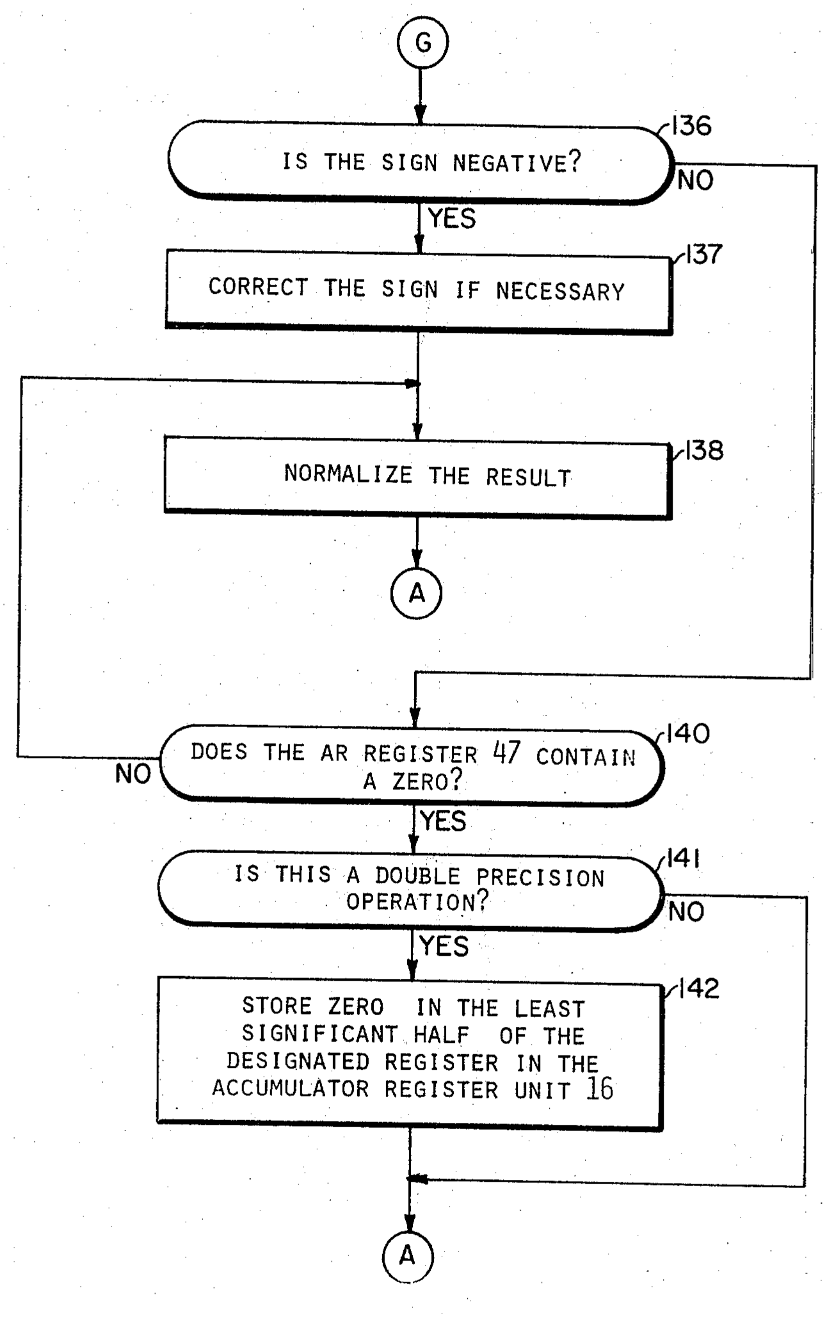

If the sign of the product is negative, Step 136 in FIG. 3D diverts to Step 137 to correct the sign, if necessary. When the sign is correct, Step 140 tests the AR register 47 to determine whether the fraction is a ZERO. If the fraction is not ZERO, Step 140 diverts to Step 138 to normalize the result. On the other hand, if the AR register is ZERO, Step 141 diverts to Step 142 to store ZEROES in the ACdst[1:0] register byte locations in the case of a double precision operation before the unit 13 returns to Step 101.

As now apparent, the MODx instruction provides a product which can be retrieved from the accumulator register unit 16 as separate integer and fraction values and in floating-point binary form. This can greatly simplify the subsequent conversion into decimal form.

Secondly, the answer is more accurate because the AR register 47 contains more bits than are included in either the fraction parts of the multiplier and multiplicand. In the case of single precision numbers, the AR register 47 contains the entire fraction so no accuracy is lost. Hence, in the case of a number that has both an integer and a fraction part, the integer and fraction parts each have the precision of the multiplier and multiplicand.

As previously indicated, the increased precision in this range of values can produce beneficial results in certain applications such as performing series calculations. In addition, it is also beneficial in converting binary information to decimal information. As is known, a binary number can be converted to a decimal number by multiplying the binary number repeatedly by 10 and then converting the integer to decimal form. This is easily accomplished with the MODx instruction using the value $10_{10}$ as the multiplier. Even in double precision numbers, it is possible to make the conversion with no loss of accuracy if the AR register has only three more bit positions than are present in double-precision, floating-point fractions.

The foregoing discussion describes a specific embodiment of apparatus for performing a multiplication operation which generates separate fraction and integer values and is limited to the specific embodiment for purposes of clarity. However, it is apparent that similar operations can be performed by other apparatus operating in other configurations. Therefore, it is an object of the appended claims to cover all such variations and modifications as come within the true spirit and scope of this invention.

What is claimed is new and desired to be secured by Letters Patent by the United States is:

1. A system for multiplying two floating-point numbers each having the same precision and each comprising a mantissa and an exponent, said system comprising:

A. mantissa calculation means including means for multiplying the mantissas of the two numbers, B. means for storing the product from said multiplying means with a precision greater than the precision of either mantissa being multiplied, C. means for adding the exponents, D. means for storing the output from said exponent addition means, and E. means responsive to the contents of said product storage and the exponent storage means for converting the contents of the product storage means into separate integer and fraction values.

2. A system as recited in claim 1 wherein said conversion means comprises:

A. means for determining the value of the exponent in the exponent storage means, B. means for generating a mask, said generating means being responsive to the value of the exponent to thereby identify the position of the binary point, and C. logic means for combining the output from said mask generating means and the contents of the product storage means for obtaining the integer and fraction values.

3. A system as recited in claim 2 wherein:

A. said exponent value determining means includes i. a counter, and ii. means for transferring the value of the exponent in said exponent storage means to said counter, and B. said mask generating means includes i. a shift rgister, and ii. means for shifting ONES into the most significant bit positions of said shift register under the control of said counter to thereby store ONE's in the number of most significant bits equal to the number in the exponent, said shift register thereby storing the mask which identifies those bits which appear in the integer and those bits which appear in the fraction values.

4. A system as recited claim 3 wherein said logic means comprises:

A. means for combining the contents of said product storage means and said shift register in a logical AND operation to obtain the integer value, and B. means for combining the contents of said product storage means and the complement of the contents of said shift register to obtain the fraction value.

5. A method for multiplying two floating-point numbers each having mantissas of the same precision and exponents to obtain a product with separate integer and fraction values, said method comprising the steps of:

A. entering the exponents into an adding means for obtaining the sum of the exponents, B. entering the mantissas into multiplying means for obtaining the product of mantissas whose precision is greater than the precision of either mantissa, C. storing in a storage means the product of the mantissas, D. generating a mask based on the exponent sum for identifying the position of the binary point in the product, E. combining the product of the mantissas from the multiplying means with the mask from the storage means to obtain the integer portion of the product in binary notation, and F. combining the product of the mantissa and the complement of the mask to obtain the fraction part of the product in binary notation.

6. A method as recited in claim 5 additionally comprising the steps of storing the integer value in one location and of storing the fraction value in a separate location.

* * * * *

UNITED STATES PATENT OFFICE
CERTIFICATE OF CORRECTION

Patent No. 3,871,578 Dated Mar. 18, 1975

Inventor(s) Adrianus J. Van De Goor et al

It is certified that error appears in the above-identified patent and that said Letters Patent are hereby corrected as shown below:

Column 1, line 27, "number" should be "numbers"

Column 3, line 64, delete "system"

Column 4, line 16, after AC7[1], insert --register--

Column 5, line 53, "(OR0-WR2)" should be "(QR0-QR2)"

Signed and sealed this 15th day of July 1975.

(SEAL)
Attest:

RUTH C. MASON
Attesting Officer

C. MARSHALL DANN
Commissioner of Patents
and Trademarks